(12) United States Patent
Scheckelhoff et al.

(10) Patent No.: US 7,343,847 B2
(45) Date of Patent: Mar. 18, 2008

(54) ACTUATOR FOR A BRAKE SYSTEM AND METHOD OF MAKING A BRAKE ACTUATOR

(75) Inventors: Ken E. Scheckelhoff, Elyria, OH (US); Ron S. Plantan, Westlake, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 82 days.

(21) Appl. No.: 11/187,005

(22) Filed: Jul. 22, 2005

(65) Prior Publication Data

US 2007/0017365 A1    Jan. 25, 2007

(51) Int. Cl.
  *F01B 19/00*    (2006.01)
(52) U.S. Cl. .............................................. 92/63; 92/99
(58) Field of Classification Search .................... 92/63, 92/64, 99, 100
  See application file for complete search history.

(56) References Cited

U.S. PATENT DOCUMENTS

| 5,771,774 A | 6/1998 | Stojic |
| 6,212,996 B1 | 4/2001 | Savel et al. |
| 6,360,649 B1 * | 3/2002 | Plantan .......................... 92/99 |

FOREIGN PATENT DOCUMENTS

| EP | 0 704 361 A1 | 4/1998 |
| GB | 2 008 525 A | 9/1981 |

OTHER PUBLICATIONS

European Search Report dated Oct. 27, 2006.

* cited by examiner

*Primary Examiner*—Michael Leslie
(74) *Attorney, Agent, or Firm*—Crowell & Moring LLP

(57) ABSTRACT

In an actuator for a brake system or a method for making a brake actuator, an attachment mechanism for attaching a diaphragm to a piston includes a plurality of protrusions on one of the piston and diaphragm and a plurality of cavities on the other of the piston and diaphragm, each protrusion being insertable into a corresponding cavity to attach the diaphragm to the piston. Alternatively, a retaining ring is provided that need not be precisely made and yet can attach the diaphragm to the piston securely and sealingly.

32 Claims, 5 Drawing Sheets

ACTUATOR FOR A BRAKE SYSTEM AND METHOD OF MAKING A BRAKE ACTUATOR

FIELD OF THE INVENTION

The invention relates to an actuator for a brake system and a method for making a brake actuator.

BACKGROUND OF THE INVENTION

Vehicles, particularly commercial vehicles, such as trucks and buses, typically utilize preventive braking system. Such preventive brake systems typically include an air-operated actuator for applying the brake itself, such as a disc or drum type brake. An example of an air operated actuator is a spring-type brake actuator, wherein the actuator includes a spring, which is compressed by the compressed air, and the compressed spring applies the brake when the compressed air is released for parking or emergency situations.

The spring brake actuator includes a housing (or cylinder), a spring pressure plate (or piston) moveably disposed in the housing, and a diaphragm that is sealingly attached to the housing and the spring pressure plate (or the parking piston). Thus, the diaphragm functions as a seal between the housing and the spring pressure plate. The housing, pressure plate and diaphragm define an air chamber for receiving compressed air. The compressed air inside the air chamber pushes against the spring pressure plate to compress the spring.

Typically, the diaphragm is attached to, and sealed against, the spring pressure plate with a retaining ring, which is mounted on the diaphragm and presses the diaphragm against the pressure plate. The retaining ring must be made with precision. If the ring is too small, it may be difficult to mount the ring on the diaphragm, or the ring may damage the diaphragm. If it is too large, the ring may not press the diaphragm against the pressure plate sufficiently for a secure attachment and seal. As a result, the retaining ring is relatively expensive.

SUMMARY OF THE INVENTION

The invention provides an actuator for a brake system and a method for making a brake actuator, wherein a retaining ring is not required to attach the diaphragm to the piston (or the spring pressure plate) securely and sealingly. Alternatively, the present invention provides a retaining ring that need not be precisely made and yet can attach the diaphragm to the piston securely and sealingly. Therefore, the present invention overcomes the disadvantages associated with the prior art.

In accordance with one aspect of the invention, an actuator for a brake assembly includes a housing, a piston moveably disposed in the housing, an elastic diaphragm for providing a seal between the housing and the piston, and an attachment mechanism that is designed to attach the diaphragm to the piston. The attachment mechanism may include a plurality of protrusions on one of the piston and diaphragm and a plurality of cavities on the other of the piston and diaphragm, and each protrusion is insertable into a corresponding indentation to secure the diaphragm to the piston.

Each protrusion preferably includes a bottom portion and a top portion that is larger than the bottom portion, and each indentation preferably includes a top portion and a bottom portion that is larger than the top portion. (As used herein, the word "larger" means larger in size, such as diameter, length, width, thickness, or volume.) When each protrusion is inserted into the corresponding indentation, the bottom portion of the protrusion may engage the top portion of the corresponding indentation, and the top portion of the protrusion may engage the bottom portion of the corresponding indentation. This arrangement provides a more secure attachment.

In one preferred embodiment, the diaphragm includes a plurality of elastic tubular members, each of which can be mounted on a protrusion on the piston. For each tubular member and the corresponding protrusion, the inner space of the tubular member may be smaller than the protrusion when the tubular member is not mounted on the protrusion. When the tubular member is mounted on the protrusion, the elasticity of the tubular member allows the tubular member to expand, and securely attaches the tubular member to the protrusion.

In accordance with another aspect of the invention, an actuator for a brake assembly includes a housing, a piston moveably disposed in the housing, and an elastic diaphragm for providing a seal between the housing and the piston. The piston includes a plurality of protrusions or a plurality of cavities, and the diaphragm is integrally molded on the protrusions or into the cavities to attach the diaphragm to the piston. In a preferred embodiment, the cavities of the piston are through-holes, and the diaphragm is integrally molded into the through holes.

In accordance with a yet another aspect of the invention, a method of making a brake actuator includes the act of attaching the elastic diaphragm of the actuator to the piston of the actuator by inserting each of a plurality of protrusions on one of the piston and diaphragm protrusion into a corresponding one of a plurality of cavities on the other of the piston and diaphragm. In a preferred embodiment, the method includes the acts of making each protrusion with a bottom portion and a top portion that is larger than the bottom portion, and making each indentation with a top portion and a bottom portion that is larger than the top portion of the indentation. When each protrusion is inserted into the corresponding indentation, the bottom portion of the protrusion engages the top portion of the corresponding indentation, and the top portion of the protrusion engages the bottom portion of the corresponding indentation. In another preferred embodiment, the diaphragm is provided with a plurality of elastic tubular members. For each tubular member and the corresponding protrusion, the inner space of the tubular member preferably is made smaller than the protrusion when the tubular member is not mounted on the protrusion. As a result, when the tubular member is mounted on the protrusion, the elasticity of the tubular member allows the tubular member to expand and secures the tubular member to the protrusion.

In accordance with a still another aspect of the invention, a method of making a brake actuator includes the acts of providing the piston with a plurality of protrusions or a plurality of cavities, and integrally molding the diaphragm on the protrusions or into the cavities of the piston to attach the diaphragm to the piston.

In the embodiments described above, the diaphragm of the brake actuator is attached to the piston of the brake actuator without the use of a retaining ring. As a result, the costs associated with the manufacturing, transporting, and storing the retaining ring are avoided.

In accordance with a further aspect of the invention, an actuator for a brake assembly includes a housing, a piston moveably disposed in the housing, an elastic diaphragm for providing a seal between the housing and the piston, and a retaining ring for attaching the diaphragm to the piston. The retaining ring has a U-shaped cross-section with two legs, and the two legs of the retaining ring press the piston and the diaphragm against each other to attach the piston and the diaphragm to each other. The U-shaped configuration can be achieved by deforming the ring around the piston and the diaphragm.

In accordance with yet further aspect of the invention, a method of making a brake actuator includes the act of using a retaining ring having a U-shaped cross-section with two legs to attach the piston and the diaphragm to each other by using the two legs of the retaining ring to press the piston and the diaphragm against each other.

In these two embodiments, although a retaining ring is used, the ring need not be made precisely. It is only necessary that the legs of the ring are sufficiently long and spaced apart to accommodate the portions of the piston and diaphragm that are pressed against each other. Then the legs of the ring can be deformed to attach the diaphragm to the piston.

In accordance with a still further aspect of the invention, an actuator for a brake assembly includes a housing, a piston moveably disposed in the housing, an elastic diaphragm for providing a seal between the housing and the piston, and a sealing mechanism that provides a seal between the diaphragm and the piston. The sealing mechanism includes a rib-shaped portion of the diaphragm, which rib is pressed against an area of the piston to provide the seal between the diaphragm and the piston. When the diaphragm is not attached to the piston, the rib preferably is smaller than the area of the piston, against which the rib is pressed. When the diaphragm is attached to the piston, the rib is stretched to the size of the area of the piston, causing the rib to be pressed against the area of the piston. The rib-shaped portion of the diaphragm may include a plurality of parallelly arranged ribs. In a preferred embodiment, the housing, pressure plate and diaphragm define an air chamber for receiving compressed air. The diaphragm includes a first side facing the air chamber and a second side on which the rib-shaped portion is disposed. When the air chamber is filled with compressed air, the compressed air presses the rib-shaped portion of the diaphragm against the piston, such as the outer periphery of the piston, to enhance the seal between the diaphragm and the piston.

In accordance with another aspect of the invention, a method of making a brake actuator includes the acts of providing the diaphragm with a rib-shaped portion; pressing the rib against an area of the piston to provide a seal between the diaphragm and the piston; making the rib smaller than the area of the piston, against which the rib is pressed, when the diaphragm is not attached to the piston; and attaching the diaphragm to the piston so that the rib of the sealing mechanism is stretched to the size of the area of the piston, causing the rib to be pressed against the area of the piston.

In the above embodiments with sealing ribs, a precisely made retaining ring is not required to seal the diaphragm against the piston. Instead, the elasticity of the diaphragm is used to press the ribs against the piston to provide a seal between the diaphragm and the piston.

In accordance with a further aspect of the invention, an actuator for a brake system includes a housing, a piston moveably disposed in the housing, and an elastic diaphragm for providing a seal between the housing and the piston. The housing has a base and a cap connected to the base, and the diaphragm includes a raised edge that is compressed between the base and the cap of the housing to attach the diaphragm to the housing. The raised edge of the diaphragm has a rib that is compressed against a ramp of the base to provide a secure seal. Preferably, the cap is connected to the base by deforming the cap around a ridge formed on the outer periphery of the base.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1:
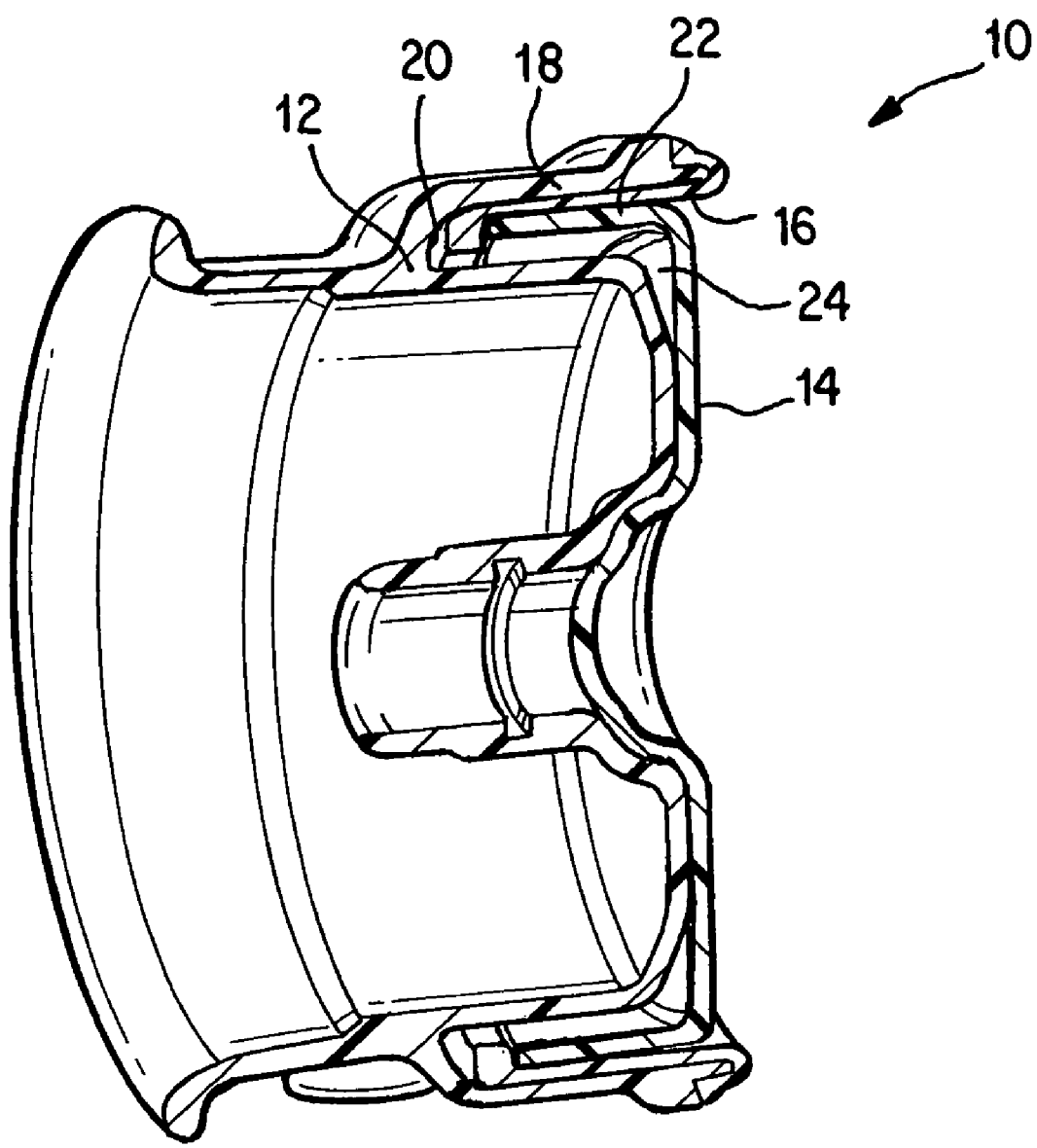
FIG. 1 is a partial cross-sectional view of an actuator for a brake system according to the invention.
Figure 2:
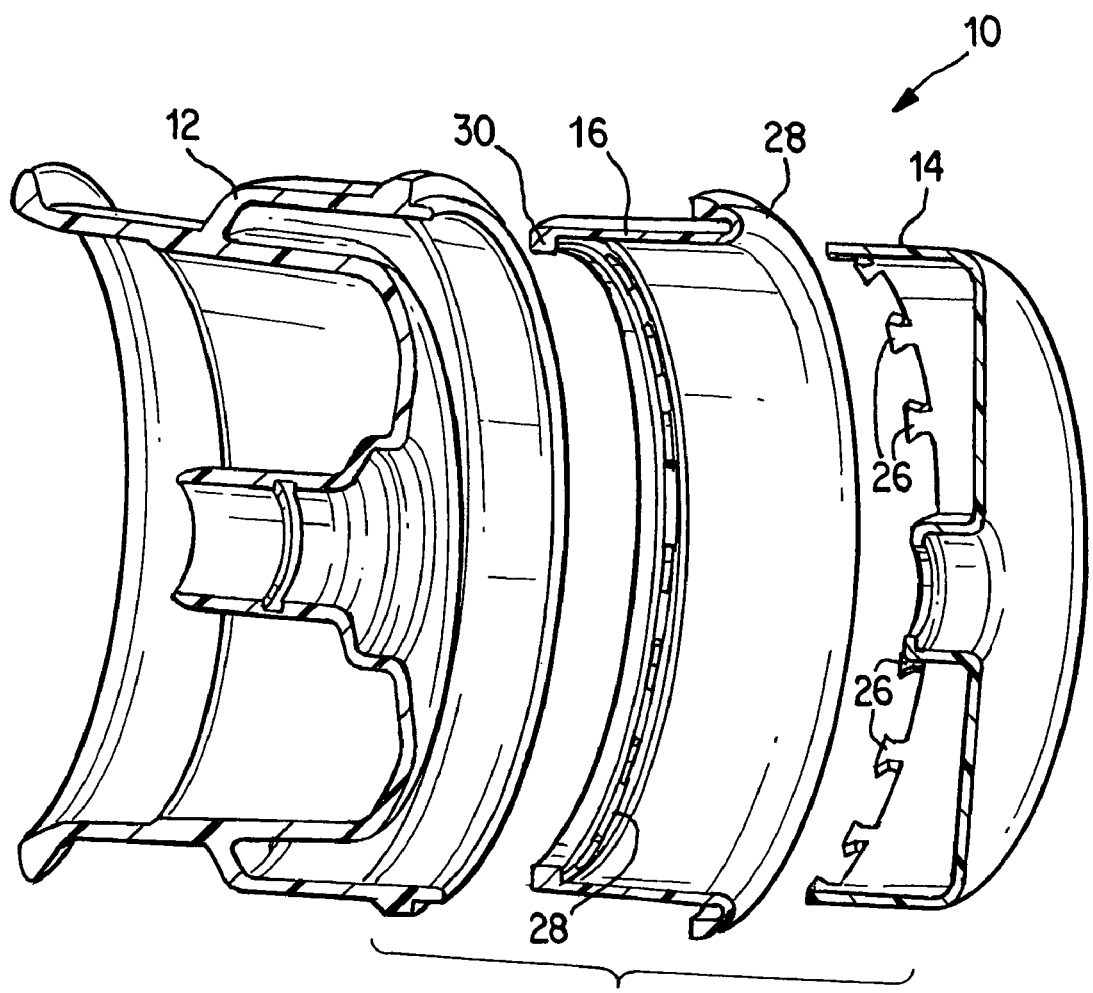
FIG. 2 is an exploded view of a portion of the actuator of FIG. 1.

FIGS. 1 and 2 show portions of an air-operated (pneumatic) actuator for a brake system. The actuator 10 includes a housing 12, a piston 14 moveably disposed in the housing 12, and an elastic diaphragm 16 that seals the gap between the housing 12 and the piston 14.

In this embodiment, a portion of the housing 12 not only is defined by a cylindrical outer wall 18 but also has a cylindrical inner wall 20, which occupies a portion of the housing's inner space. The inner wall 20 does not interfere with the movement of the piston 14, because the piston 14 is hollow and the inner wall 20 can extend into the piston 12. The outer circumferential wall 22 of the piston 14, on the other hand, can extend into the space between the outer and inner walls 18, 20 of the housing 12. The outer and inner walls 18, 20 of the housing 12, the piston 14, and the diaphragm 16 define an air chamber 24 for receiving compressed air, which can move the piston 14 relative to the housing 12. In general, however, the housing and piston of the present invention can each have any suitable configuration. For example, the housing may be a simple hollow cylinder, and the piston may be a solid cylinder or a circular plate, which can move axially inside the hollow cylindrical housing.

As shown in FIG. 2, the actuator 10 includes an attachment mechanism for attaching the diaphragm 16 to the piston 14. This attachment mechanism includes a plurality of protrusions 26 and a plurality of cavities 28, wherein each protrusion 26 is inserted, or is insertable, into a corresponding indentation 28 to secure the diaphragm 16 to the piston 14. The term "indentation" as used herein includes a through hole. In this embodiment, the protrusions 26 are arranged on the piston 14 and the cavities 28 are arranged on the diaphragm 16, although the protrusions may be arranged on the diaphragm and the cavities may be arranged on the piston.

Figure 3:
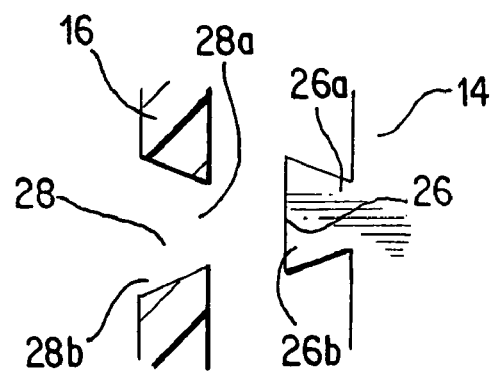
FIG. 3 shows a protrusion and an indentation of an attachment mechanism used in the actuator of FIGS. 1 and 2.

In a preferred embodiment shown in FIG. 3, each protrusion 26 of the attachment mechanism has a bottom portion 26a and a top portion 26b that is wider than the bottom portion 26a, and each cavity 28 (a through hole in this embodiment) includes a top portion 28a and a bottom portion 28b that is wider than the top portion 28a of the cavity 28. When the protrusion 26 is inserted into the cavity 28, the bottom portion 26a of the protrusion 26 engages the top portion 28a of the cavity 28, and the top portion 26b of the protrusion 26 engages the bottom portion 28b of the cavity 28. With this arrangement, the protrusion 26 can be securely locked inside the cavity 28.

In accordance with another aspect of the invention, the elastic diaphragm is integrally molded on the piston. Preferably, the portion of the piston for attaching the diaphragm is configured so that the diaphragm can be securely molded thereto. For example, the piston may have the protrusions 26 of FIG. 2, and the diaphragm may be integrally molded on the protrusions 26. Alternatively, the piston may have the cavities 28, and the diaphragm may be integrally molded into the cavities 28. In some cases, the cavities of the piston may be through holes, and the diaphragm material can enter each hole through both of its openings to ensure the hole is filled with the diaphragm material. The process of integral molding itself is well known in the art and will not be discussed in detail here.

Figure 4:
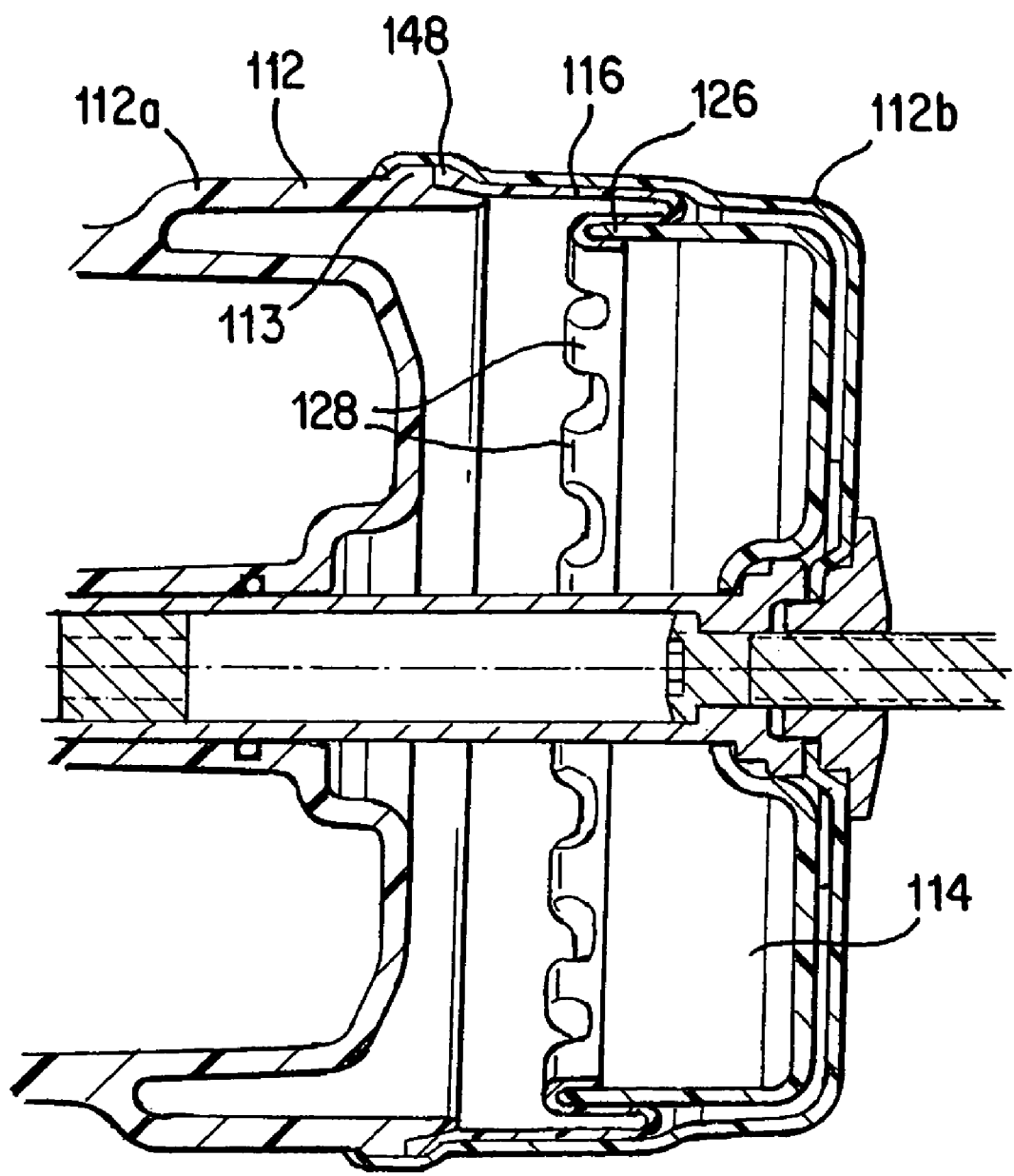
FIG. 4 is a cross-sectional view of another attachment mechanism according to the invention.

FIG. 4 shows another embodiment of the attachment mechanism. In this embodiment, the attachment mechanism includes a plurality of protrusions 126 arranged on the piston 114, which are similar to those shown in FIGS. 1 and 2, and a plurality of elastic tubular members 128 on the diaphragm 116. The protrusions 126 of the piston 114, can be extended into the respective tubular members 128 of the diaphragm 116 to secure the diaphragm 116 to the piston 114. Analogous to the attachment mechanism shown in FIGS. 1 and 2, the inner space of each tubular member 128 can be considered as an cavity on the diaphragm 116, into which a protrusion 126 of the piston 114 can extend. Preferably, the inner space of the tubular member 128 is smaller than the protrusion 126 when the tubular member 128 is not mounted on the protrusion 126. When the tubular member 128 is mounted on the protrusion 126, the elasticity of the tubular member 128 allows the tubular member 128 to expand and secures the tubular member 128 to the protrusion 126.

The protrusions and cavities of the attachment mechanism can be arranged at any suitable location on the piston and diaphragm. In the embodiment shown in FIGS. 1 and 2, for example, the protrusions 26 are arranged at the end of the piston's outer cylindrical wall 22 and extend in the axial direction. The cavities 28 are arranged on a raised edge 30 of the diaphragm 16 and also extend in the axial direction. The raised edge 30 has sufficient volume to accommodate the cavities 28. Alternatively, either or both of the protrusions and the cavities can extend in any other direction, such as the radial direction.

Figure 5:
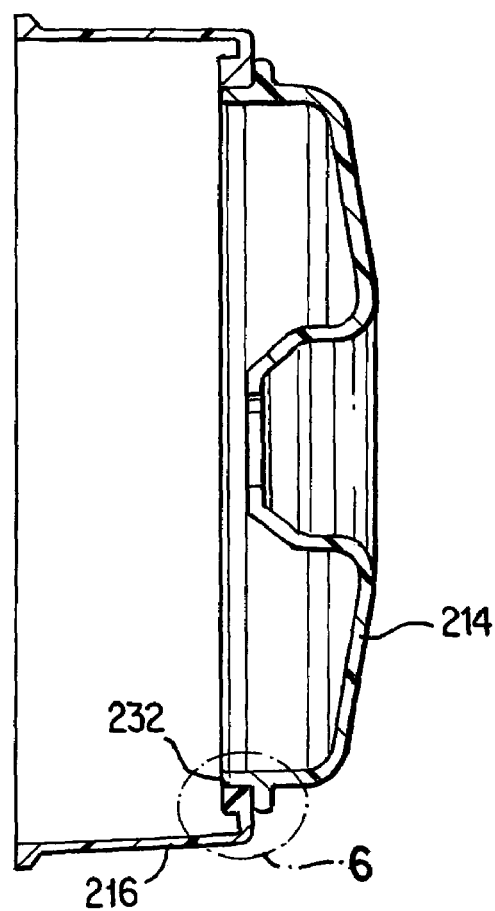
FIG. 5 is a cross-sectional view of a further actuator for a brake assembly according to the invention.
Figure 6:
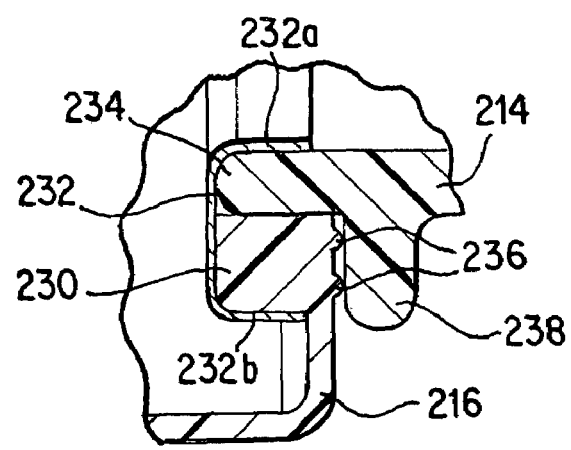
FIG. 6 is a detailed cross-sectional view of a portion of the actuator of FIG. 5 that shows a retaining ring.

In accordance with a further aspect of the invention, a retaining ring is used to attach a brake actuator's diaphragm to its piston. This retaining ring, however, is different from conventional retaining rings used in brake actuators in that it need not be precisely made. As shown in FIGS. 5 and 6, the retaining ring 232 has a U-shaped cross-section with two legs 232a, 232b. A raised edge 230 of the diaphragm 216 and the end 234 of the piston 214 are clamped between the two legs 232a, 232b to attach the diaphragm 216 to the piston 214. The diaphragm 216 has two ribs 236 that are pressed against a radially extending flange 238 of the piston 214 to seal the diaphragm 216 against the piston 214.

The retaining ring 232 shown in FIGS. 5 and 6 need not be precisely made because, in contrast to conventional retaining rings used in brake actuators, it does not rely on its dimension, such as the inner or outer diameter, to attach the diaphragm to the piston. Instead the ring 232 clamps the diaphragm and the piston together for attachment. If a conventional retaining ring is not precisely made, it may compress the diaphragm against the piston either insufficiently for a proper attachment and seal, or excessively, damaging the diaphragm or at least making it difficult to mount the retaining ring on the diaphragm.

Figure 7:
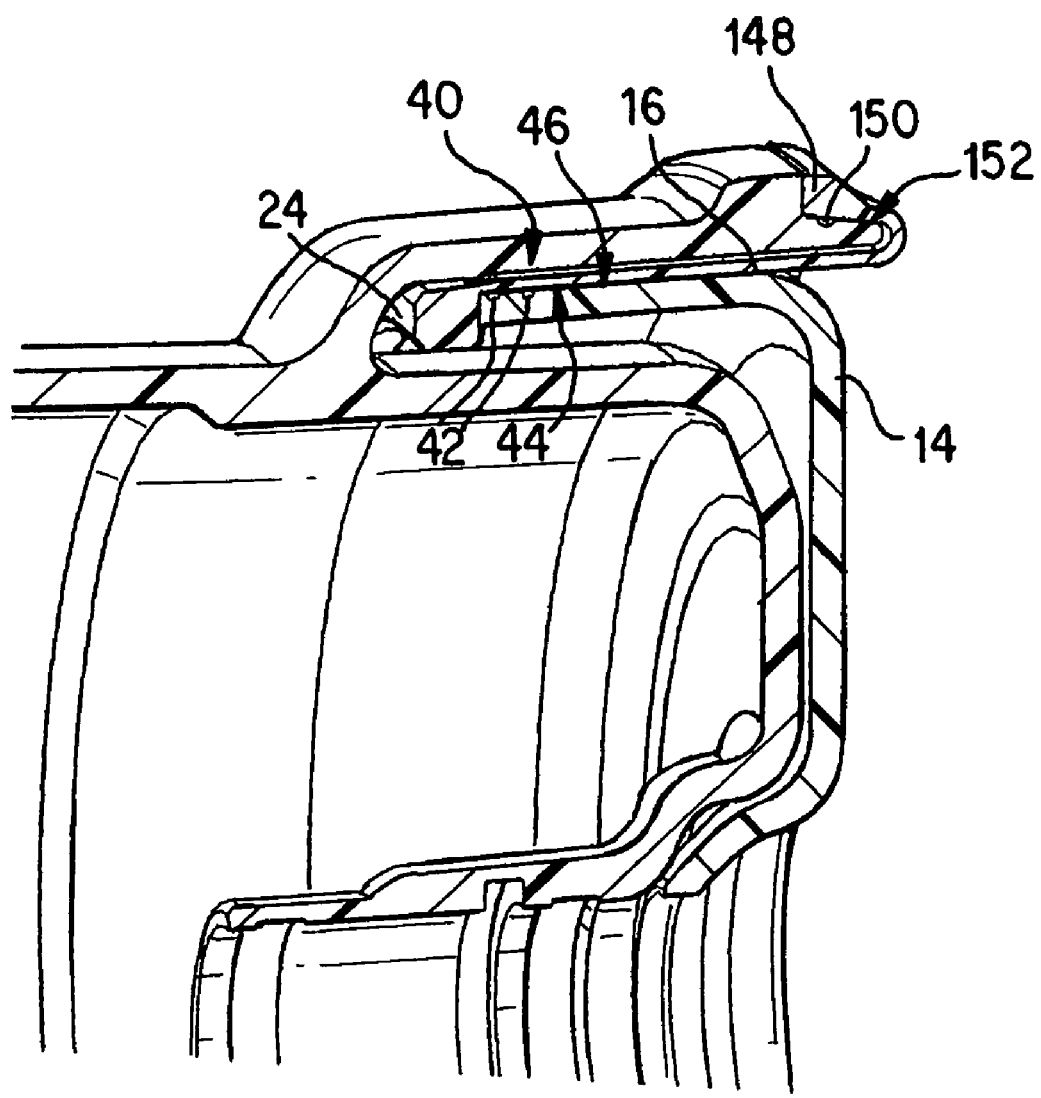
FIG. 7 is a detailed partial cross-sectional view of the actuator of FIG. 1 that shows the sealing ribs, which are disposed at the ends of the diaphragm, respectively.

Although the above-discussed attachment mechanisms often provide an adequate seal between the diaphragm and the piston, it may be desirable in certain cases to provide a separate sealing mechanism to ensure that the diaphragm is securely sealed against the piston. FIG. 7 illustrates such a sealing mechanism 40. In the actuator shown in FIG. 7, the diaphragm 16 has a generally cylindrical configuration and, in the position shown in FIG. 7, is concentrically arranged with the piston 14. The diaphragm 16 includes two ribs 42 on its inner surface 44, each rib 42 forming a generally circular ring on the surface 44, although it may have one rib or more than two ribs.

The ribs 42 are pressed against the outer surface 46 of the piston 14 by the elasticity of the diaphragm 16 and/or of the ribs 42. When the diaphragm 16 is not attached to the piston 14, the ribs 42 or the area of the diaphragm 16, on which the ribs 42 are arranged, are smaller than the outer diameter of the area of the piston, on which the ribs 42 are to be pressed against. When the diaphragm 16 is attached to the piston 14 as shown in FIG. 7, the ribs 42 or the area of the diaphragm 16 is stretched so that the elasticity of the ribs 42 or of the diaphragm 16 presses the ribs 42 against the outer surface 46 of the piston 14 to form a secure seal. Furthermore, when the air chamber 24 is filled with compressed air, the compressed air further presses the ribs 42 against the outer surface 46 of the piston 14.

The diaphragm is also attached to and sealed against the housing of the actuator. In the embodiment shown in FIG. 4, for example, the housing 112 includes a base 112a and a cap 112b connected to the base 112a. Preferably, the base 112a has a circular ridge 113, and the cap 112b is deformed around the circular ridge 113 to form the connection between the base 112a and the cap 112b. The diaphragm 116 has a second raised edge 148 that is compressed between the base 112a and cap 112b of the housing 112. As a result, the diaphragm 116 is attached to and sealed against the housing 112. Preferably, as shown in FIG. 7, the second raised edge 148 of the diaphragm 116 has a rib 150 that is compressed against a ramp 152 of the base 112a to provide a secure seal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An actuator for a brake system comprising:
a housing;
a piston moveably disposed in the housing;
an elastic diaphragm for providing a seal between the housing and the piston; and
an attachment mechanism configured to attach the diaphragm to the piston, wherein the attachment mechanism includes a plurality of protrusions on one of the piston and diaphragm and a plurality of cavities on the other of the piston and diaphragm, each protrusion being insertable into a corresponding cavity to attach the diaphragm to the piston.

2. The actuator of claim 1,
wherein each protrusion includes a bottom portion and a top portion that is larger than the bottom portion,
wherein each cavity includes a top portion and a bottom portion that is larger than the top portion of the cavity, and
wherein when each protrusion is inserted into the corresponding cavity, the bottom portion of the protrusion engages the top portion of the corresponding cavity, and the top portion of the protrusion engages the bottom portion of the corresponding cavity.

3. The actuator of claim 1, wherein the protrusions are on the piston and the cavities are on the diaphragm, and wherein the diaphragm includes a plurality of elastic tubular members, each cavity of the diaphragm being defined by the inner space of one of the tubular members.

4. The actuator of claim 3, wherein for each tubular member and the corresponding protrusion, the inner space of the tubular member is smaller than the protrusion when the tubular member is not mounted on the protrusion, and wherein when the tubular member is mounted on the protrusion, the elasticity of the tubular member allows the tubular member to expand and secures the tubular member to the protrusion.

5. The actuator of claim 1, further comprising
a sealing mechanism for providing a seal between the diaphragm and the piston,
wherein the sealing mechanism includes a rib-shaped portion of the diaphragm, the rib being pressed against an area of the piston to provide the seal between the diaphragm and the piston,
wherein when the diaphragm is not attached to the piston, the rib of the sealing mechanism is smaller than the area of the piston, against which the rib is pressed, and
wherein when the diaphragm is attached to the piston, the rib of the sealing mechanism is stretched to the size of the area of the piston, causing the rib to be pressed against the area of the piston.

6. An actuator for a brake system comprising:
a housing;
a piston moveably disposed in the housing, wherein the piston includes a plurality of protrusions or a plurality of cavities; and
an elastic diaphragm for providing a seal between the housing and the piston, wherein the diaphragm is integrally molded on the protrusions or into the cavities of the piston to attach the diaphragm to the piston.

7. The actuator of claim 6, wherein the piston includes the plurality of cavities, and wherein the cavities are through-holes.

8. The actuator of claim 6, further comprising
a sealing mechanism for providing a seal between the diaphragm and the piston,
wherein the sealing mechanism includes a rib-shaped portion of the diaphragm, the rib being pressed against an area of the piston to provide the seal between the diaphragm and the piston,
wherein when the diaphragm is not attached to the piston, the rib of the sealing mechanism is smaller than the area of the piston, against which the rib is pressed, and
wherein when the diaphragm is attached to the piston, the rib of the sealing mechanism is stretched to the size of the area of the piston, causing the rib to be pressed against the area of the piston.

9. An actuator for a brake system comprising:
a housing;
a piston moveably disposed in the housing;
an elastic diaphragm for providing a seal between the housing and the piston; and
an attachment mechanism that is designed to attach the diaphragm to the piston,
wherein the attachment mechanism includes a retaining ring having a U-shaped cross-section with two legs, and
wherein the two legs of the retaining ring press the piston and the diaphragm against each other to attach the piston and the diaphragm to each other.

10. An actuator for a brake system comprising:
a housing;
a piston moveably disposed in the housing;
an elastic diaphragm for providing a seal between the housing and the piston; and
a sealing mechanism for providing a seal between the diaphragm and the piston,
wherein the sealing mechanism includes a rib-shaped portion of the diaphragm, the rib being pressed against an area of the piston to provide the seal between the diaphragm and the piston,
wherein when the diaphragm is not attached to the piston, the rib of the sealing mechanism is smaller than the area of the piston, against which the rib is pressed, and
wherein when the diaphragm is attached to the piston, the rib of the sealing mechanism is stretched to the size of the area of the piston, causing the rib to be pressed against the area of the piston.

11. The actuator of claim 10, wherein the rib-shaped portion of the diaphragm includes a plurality of parallel arranged ribs.

12. The actuator of claim 10, wherein the housing, piston and diaphragm define an air chamber for receiving compressed air,
wherein the diaphragm includes a first side facing the air chamber and a second side on which the rib-shaped portion is disposed, and
wherein when the air chamber is filled with compressed air, the compressed air pushes the rib-shaped portion of the diaphragm against the piston to enhance the seal between the diaphragm and the piston.

13. A method of making a brake actuator comprising a housing, a piston moveably disposed in the housing, and an elastic diaphragm for providing a seal between the housing and the piston, the method comprising the acts of:
attaching the elastic diaphragm to the piston by inserting each of a plurality of protrusions on one of the piston and diaphragm into a corresponding one of a plurality of cavities on the other of the piston and diaphragm.

14. The method of claim 13, further comprising the acts of:
making each protrusion with a bottom portion and a top portion that is larger than the bottom portion; and
making each cavity with a top portion and a bottom portion that is larger than the top portion of the cavity,
wherein when each protrusion is inserted into the corresponding cavity, the bottom portion of the protrusion engages the top portion of the corresponding cavity, and the top portion of the protrusion engages the bottom portion of the corresponding cavity.

15. The method of claim 13, wherein the plurality of protrusions are on the piston and the plurality of cavities are on the diaphragm, the method further comprising providing the diaphragm with a plurality of elastic tubular members, each cavity of the diaphragm being defined by the inner space of one of the tubular members.

16. The method of claim 15, further comprising, for each tubular member and the corresponding protrusion, making the inner space of the tubular member smaller than the protrusion when the tubular member is not mounted on the protrusion, so that when the tubular member is mounted on the protrusion, the elasticity of the tubular member allows the tubular member to expand and secures the tubular member to the protrusion.

17. The method of claim 13, further comprising the acts of
providing the diaphragm with a rib-shaped portion;
pressing the rib against an area of the piston to provide a seal between the diaphragm and the piston;
making the rib smaller than the area of the piston, against which the rib is pressed, when the diaphragm is not attached to the piston; and
attaching the diaphragm to the piston so that the rib of the sealing mechanism is stretched to the size of the area of the piston, causing the rib to be pressed against the area of the piston.

18. A method of making a brake actuator comprising a housing, a piston moveably disposed in the housing, and an elastic diaphragm for providing a seal between the housing and the piston, the method comprising the acts of:
providing the piston with a plurality of protrusions or a plurality of cavities; and
integrally molding the diaphragm on the protrusions or into the cavities of the piston to attach the diaphragm to the piston.

19. The method of claim 18, wherein the piston includes the plurality of cavities, and wherein the cavities are through-holes.

20. The method of claim 18, further comprising the acts of
providing the diaphragm with a rib-shaped portion;
pressing the rib against an area of the piston to provide a seal between the diaphragm and the piston;
making the rib smaller than the area of the piston, against which the rib is pressed, when the diaphragm is not attached to the piston; and
attaching the diaphragm to the piston so that the rib of the sealing mechanism is stretched to the size of the area of the piston, causing the rib to be pressed against the area of the piston.

21. A method of making a brake actuator comprising a housing, a piston moveably disposed in the housing, and an elastic diaphragm for providing a seal between the housing and the piston, the method comprising:
using a retaining ring having a U-shaped cross-section with two legs to attach the piston and the diaphragm to each other by pressing the piston and the diaphragm against each other with the two legs of the retaining ring.

22. A method of making a brake actuator comprising a housing, a piston moveably disposed in the housing, and an elastic diaphragm for providing a seal between the housing and the piston, the method comprising:
providing the diaphragm with a rib-shaped portion;
pressing the rib against an area of the piston to provide a seal between the diaphragm and the piston;
making the rib smaller than the area of the piston, against which the rib is pressed, when the diaphragm is not attached to the piston; and
attaching the diaphragm to the piston so that the rib of the sealing mechanism is stretched to the size of the area of the piston, causing the rib to be pressed against the area of the piston.

23. The method of claim 22, wherein the rib-shaped portion of the diaphragm includes a plurality of parallelly arranged ribs.

24. The method of claim 22, wherein the housing, piston and diaphragm define an air chamber for receiving compressed air,
wherein the diaphragm includes a first side facing the air chamber and a second side on which the rib-shaped portion is disposed, and
wherein when the air chamber is filled with compressed air, the compressed air pushes the rib-shaped portion of the diaphragm against the piston to enhance the seal between the diaphragm and the piston.

25. A piston/diaphragm assembly for an actuator of a brake system, comprising:
a piston;
an elastic diaphragm; and
an attachment mechanism configured to attach the diaphragm to the piston, wherein the attachment mechanism includes a plurality of protrusions on one of the piston and diaphragm and a plurality of cavities on the other of the piston and diaphragm, each protrusion being insertable into a corresponding cavity to attach the diaphragm to the piston.

26. The piston/diaphragm assembly of claim 25, wherein the protrusions are on the piston and the cavities are on the diaphragm, and wherein the diaphragm includes a plurality of elastic tubular members, each cavity of the diaphragm being defined by the inner space of one of the tubular members.

27. The piston/diaphragm assembly of claim 26, wherein for each tubular member and the corresponding protrusion, the inner space of the tubular member is smaller than the protrusion when the tubular member is not mounted on the protrusion, and wherein when the tubular member is mounted on the protrusion, the elasticity of the tubular member allows the tubular member to expand and secures the tubular member to the protrusion.

28. A piston/diaphragm assembly for an actuator of a brake system, comprising:
a piston including a plurality of protrusions or a plurality of cavities; and
an elastic diaphragm that is integrally molded on the protrusions or into the cavities of the piston to attach the diaphragm to the piston.

29. The piston/diaphragm assembly of claim 28, wherein the piston includes the plurality of cavities, and wherein the cavities are through-holes.

30. A piston/diaphragm assembly for an actuator of a brake system, comprising:
a piston;
an elastic diaphragm; and
a sealing mechanism for providing a seal between the diaphragm and the piston,
wherein the sealing mechanism includes a rib-shaped portion of the diaphragm, the rib being pressed against an area of the piston to provide the seal between the diaphragm and the piston,
wherein when the diaphragm is not attached to the piston, the rib of the sealing mechanism is smaller than the area of the piston, against which the rib is pressed, and
wherein when the diaphragm is attached to the piston, the rib of the sealing mechanism is stretched to the size of the area of the piston, causing the rib to be pressed against the area of the piston.

31. An actuator for a brake system comprising:

a housing including a base and a cap connected to the base;

a piston moveably disposed in the housing;

an elastic diaphragm for providing a seal between the housing and the piston, and an attachment mechanism configured to attach the diaphragm to the piston, wherein the attachment mechanism includes a plurality of protrusions on one of the piston and diaphragm and a plurality of cavities on the other of the piston and diaphragm, each protrusion being insertable into a corresponding cavity to attach the diaphragm to the piston, wherein the diaphragm includes a raised edge that is compressed between the base and the cap of the housing to attach the diaphragm to the housing, and wherein the raised edge of the diaphragm has a rib that is compressed against a ramp of the base to provide a secure seal.

32. The actuator of claim 31, wherein the cap is connected to the base by deforming the cap around a ridge formed on the outer periphery of the base.

* * * * *